Patented Oct. 24, 1950

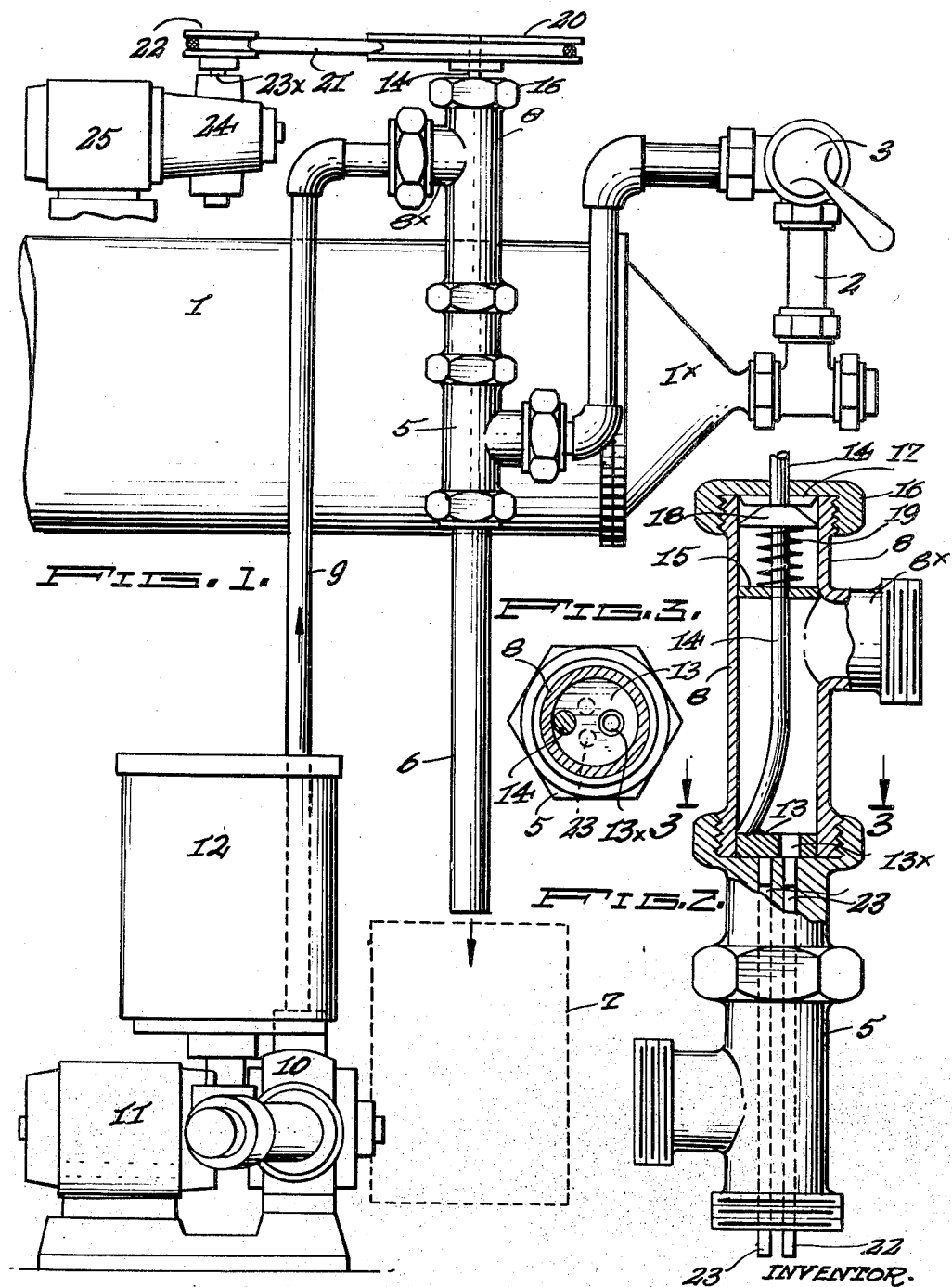

2,527,273

UNITED STATES PATENT OFFICE 2,527,273

APPARATUS FOR MAKING VARIEGATED ICE CREAM

Louis F. Marks, Pittsburgh, Pa., assignor to Gerald G. Balch, Pittsburgh, Pa.

Application May 28, 1948, Serial No. 29,673

2 Claims. (Cl. 107—1)

The object of the present invention is to provide means for manufacturing ice cream incorporating a flavor material, such as solidified chocolate syrup in discrete portions, such a varicolored ice cream product being well known in the art. The specific object of the invention is to provide simple and effective means for better control of the chocolate or other syrup material so that it will be evenly distributed in the ice cream and the discrete portions controlled to about the same individual sizes, the control being such that the ratio of syrup may be varied simply by the speed of mechanical actuation of the syrup control device.

The ice cream is maintained in plastic state while being fed under pressure to a chamber or conduit leading to a discharge point at which the ice cream, with the particles of plastic syrup material, is delivered to containers. In its flow the ice cream receives, at spaced points, portions of "syrups" of regulated size. By increasing or decreasing the speed of the syrup control device, the ratio of syrup to ice cream can be widely varied.

The invention will be described with reference to the accompanying drawings, in which:

Fig. 1 is a schematic view in elevation showing an assembly of units incorporating an embodiment of my invention;

Fig. 2 is a view in elevation, partly in section and partly in dotted lines, showing the syrup control assembly; and Fig. 3 is a view in horizontal section on the line 3—3 of Fig. 2.

Referring to the drawings, I have shown at 1 somewhat schematically, the forward portion of a continuous ice cream freezing unit, such units being well known in the art, and each having at the end thereof a discharge area 1x, leading to an upwardly extending outflow pipe 2 controlled by manually operated valve 3. When the valve is moved to open position the ice cream enters the branch pipe of a chamber member 5 from which it passes to discharge pipe 6 and into container, such as that indicated by dotted lines at 7.

Mounted on chamber member 5 is the syrup receiving and control member. It consists of a cylinder having a threaded lower end adapted to be received by the threaded upper enlarged end of member 5. It is formed with a syrup inlet branch pipe 8x to which is connected a pipe 9 leading to the outflow of a pump diagrammatically shown at 10 and driven by motor 11. Syrup is led to the intake of the pump from a syrup vessel 12.

Syrup entering the syrup control member 8 flows downward into engagement with a rotary valve 13 having a single opening or discharge port at 13x. The valve is connected to the lower end of an operating shaft 14 guided in the walls of an aperture formed in a spacer disk 15, the shaft passing upwardly through an opening in cap member 16. A sealing washer, indicated at 17, surrounds the shaft and may be engaged by a pressure disk 18 pressed upwardly by a spring 19, the lower end of which bears upon spacer disk 15.

Shaft 14 is rotated by any suitable means. For example, in the embodiment shown, the shaft carries a pulley 20 driven by a belt 21 from drive wheel 22, the wheel being on a shaft 23x, leading to a gear reduction box 24 receiving power from a motor 25. By varying the size of pulley 20 control of the speed of valve 13 may be effected.

The solid upper portion of member 5 is formed with a plurality of longitudinally extending bores which are in communication with a corresponding number of tubes 23 which project downwardly with respect to member 5.

As valve 13 rotates, its outlet port 13x comes successively into register with the tubes 23 and the syrup, generally under pressure, within the syrup control member 8, is caused to pass into the tubes and into the ice cream flowing through member 5 to the discharge pipe 6. It will be obvious, therefore, that measured, discrete portions of syrup are discharged into the ice cream, and the volume of such discrete portions is regulated by the speed at which shaft 14 is rotated.

Having thus described my invention, what I claim and desire to secure by Letters Patent, is as follows:

1. An apparatus for producing ice cream containing discrete portions of contrasting material such as chocolate syrup, which consists in two tubular members removably interconnected and in line arrangement, the first member having an inlet and an outlet for plastic ice cream, and having a top wall formed with a plurality of ducts arranged in a curvilinear line, a rotary valve disk coacting with said wall, said disk having a port adapted to be traversed within said curvilinear line for control of said ducts, an inlet for syrup provided for said second member and a shaft connected to the rotary valve disk.

2. An apparatus for producing ice cream containing discrete portions of contrasting material such as chocolate syrup, which consists in a casing member having a plastic ice cream receiving port, a wall in said casing member above said port and having a plurality of apertures arranged in a curvilinear line, a rotary valve member having a single port and located adjacent said wall of the casing, means for rotating said valve member to bring the single port successively into register with the apertures in said curvilinear line, a chamber member surrounding said valve and adapted to receive a second plastic material.

LOUIS F. MARKS.

REFERENCES CITED

The following references are of record in the file of this patent:

UNITED STATES PATENTS

| Number | Name | Date |
|---|---|---|
| 1,083,275 | Eberhard | Jan. 6, 1914 |
| 2,282,313 | Hershey | May 12, 1942 |
| 2,313,060 | Friedman | Mar. 9, 1943 |
| 2,389,084 | Routh | Nov. 13, 1945 |